United States Patent
Zhang et al.

(10) Patent No.: US 12,041,470 B2
(45) Date of Patent: Jul. 16, 2024

(54) METHODS, APPARATUS AND SYSTEMS FOR INDICATING TRANSMISSION FAILURES IN A WIRELESS COMMUNICATION

(71) Applicant: ZTE Corporation, Guangdong (CN)

(72) Inventors: Li Zhang, Shenzhen (CN); Yajun Zhao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 229 days.

(21) Appl. No.: 17/357,645

(22) Filed: Jun. 24, 2021

(65) Prior Publication Data
US 2022/0053346 A1   Feb. 17, 2022

Related U.S. Application Data

(63) Continuation of application No. PCT/CN2018/124703, filed on Dec. 28, 2018.

(51) Int. Cl.
*H04W 24/04* (2009.01)
*H04W 74/0808* (2024.01)
*H04W 76/18* (2018.01)

(52) U.S. Cl.
CPC .................. *H04W 24/04* (2013.01)

(58) Field of Classification Search
None
See application file for complete search history.

(56) References Cited

U.S. PATENT DOCUMENTS

| | | | |
|---|---|---|---|
| 10,721,770 B2 | 7/2020 | Vajapeyam et al. | |
| 2016/0270121 A1 | 9/2016 | Bergstrom et al. | |
| 2017/0006599 A1 | 1/2017 | Dinan | |
| 2017/0006640 A1* | 1/2017 | Dinan | H04W 74/0833 |
| 2017/0006641 A1 | 1/2017 | Dinan | |
| 2020/0100294 A1* | 3/2020 | Chen | H04W 80/02 |
| 2020/0112996 A1* | 4/2020 | Pan | H04W 72/0453 |

(Continued)

FOREIGN PATENT DOCUMENTS

| CN | 106797571 A | 5/2017 |
|---|---|---|
| CN | 107302770 A | 10/2017 |

(Continued)

OTHER PUBLICATIONS

First Office Action and Search Report for Chinese application No. 202111530201.9 dated Jun. 6, 2022, 8p, in Chinese language.

(Continued)

*Primary Examiner* — Duc T Duong
(74) *Attorney, Agent, or Firm* — Crowell & Moring LLP

(57) ABSTRACT

Methods, apparatus and systems for indicating transmission failures in a wireless communication are disclosed. In one embodiment, a method performed by a wireless communication device is disclosed. The method comprises: obtaining, by a first layer module of the wireless communication device, an indication from a second layer module of the wireless communication device. The first layer module is configured for performing a process at a first layer. The second layer module is configured for performing a process at a second layer that is different from the first layer. The indication indicates whether there is a transmission failure of the wireless communication device at the second layer.

16 Claims, 3 Drawing Sheets

(56) References Cited

U.S. PATENT DOCUMENTS

| | | | |
|---|---|---|---|
| 2020/0275485 A1* | 8/2020 | Babaei | H04W 74/0808 |
| 2020/0367314 A1* | 11/2020 | Belleschi | H04L 27/0006 |
| 2021/0084583 A1* | 3/2021 | Niu | H04W 48/20 |
| 2021/0212112 A1* | 7/2021 | Jia | H04W 24/08 |
| 2021/0250793 A1* | 8/2021 | Shi | H04L 1/201 |
| 2022/0007394 A1* | 1/2022 | Hong | H04L 5/0082 |
| 2022/0039016 A1* | 2/2022 | Terry | H04W 52/0235 |
| 2022/0039096 A1* | 2/2022 | Wang | H04B 17/318 |
| 2022/0232631 A1* | 7/2022 | Dinan | H04L 41/0654 |
| 2022/0312484 A1* | 9/2022 | Murray | H04W 74/0833 |

FOREIGN PATENT DOCUMENTS

| | | |
|---|---|---|
| CN | 107770878 A | 3/2018 |
| WO | WO 2007/128204 A1 | 11/2007 |
| WO | WO 2015/046781 A1 | 4/2015 |
| WO | WO 2016/054584 A2 | 4/2016 |
| WO | WO 2016/054584 A3 | 4/2016 |
| WO | WO 2017/136458 A2 | 8/2017 |
| WO | WO 2017/177785 A1 | 10/2017 |
| WO | WO 2017/181124 A1 | 10/2017 |
| WO | WO 2020/087369 A1 | 5/2020 |

OTHER PUBLICATIONS

English Translation of B6.
ZTE Corporation, "consideration on SR enhancement for NR-U operation", 3GPP TSG RAN WG2 NR Meeting #103bis, R2-1813723, Oct. 12, 2018, China, 2p.
MediaTek Inc., "Handling systematic LBT failures in Random Access", 3GPP TSG RAN WG2 Meeting #104, R2-1816684, Nov. 16, 2018, 4p, United States.
OPPO, "SR transmission and procedure for NR-U", 3GPP TSG RAN WG2 Meeting #103bis, R2-1813585, Oct. 12, 2018, 3p, China.
Nokia et al., "On the impact of LBT on RA and SR procedures", 3GPP TSG RAN WG2 Meeting #103bis, R2-1814293, Oct. 12, 2018, 3p, China.
Huawei et al., "Discussion on SR for NR-U", 3GPP TSG RAN WG2 Meeting #103bis, R2-1814862, Oct. 12, 2018, 1p, China.
Extended European Search Report for application No. EP 18930143.5 dated Jun. 24, 2022, 8p.
ZTE, "impacts on MAC for NR-U operation", 3GPP TSG RAN WG2 NR Meeting #103, R2-1811282, Aug. 24, 2018, 3p, Sweden.
First Examination Report for corresponding Indian application No. 202117028907 dated Jan. 20, 2023, 6p, in Indian language with English translation.
Second Office Action for Chinese application No. 202111530201.9 dated Oct. 10, 2022, 4p, in Chinese language.
English language translation of the Second Office Action for Chinese application No. 202111530201.9 dated Oct. 10, 2022, 4p.
International Search Report for priority application No. PCT/CN2018/124703, dated Jul. 10, 2019, 3p.
Written Opinion of the International Searching Authority for priority application No. PCT/CN2018/0124703, dated Jul. 4, 2019, 3p.
Examination Report for corresponding Canadian application No. 3,121,648 dated Sep. 26, 2023, 4p.
Final rejection for corresponding Korean application No. 9-5-2023-1117932722 dated Dec. 12, 2023, 4p, in Korean language.
Concise Explanation of Relevance of final rejection for corresponding Korean application No. 9-5-2023-1117932722 dated Dec. 12, 2023, 1p.
English language translation of Rejection Decision for corresponding Chinese application No. 202111530201.9 dated Apr. 29, 2023, 8p.
Rejection Decision for corresponding Chinese application No. 202111530201.9 dated Apr. 29, 2023, 7p, in Chinese language.
Office Action for corresponding Korean application No. 9-5-2023-057558922 dated Jun. 26, 2023, 4p, in Korean language.
Concise Explanation of Relevance of Office Action for corresponding Korean application No. 9-5-2023-057558922 dated Jun. 26, 2023, 2p.
InterDigital Inc, "Power ramping for Msg1 Preamble Retransmissions", 3GPP TSG-RAN WG2 Meeting #99, R2-1708724, Aug. 25, 2017, 5p, DE.
ITRI, "Study on the impact of RACH procedure for NR-U", 3GPP TSG-RAN WG1 Meeting #94bis, R1-1811315, Oct. 12, 2018, 3p, CN.
Vivo, "Counter for Preamble Transmission Attempt", 3GPP TSG-RAN WG2 Meeting #104, R2-1818259, Nov. 16, 2018, 2p, US.
Written Opinion for corresponding Singapore application No. 11202105717V dated Jun. 29, 2023, 8p.
Search Report for corresponding Singapore application No. 11202105717V dated Jun. 28, 2023, 3p.

\* cited by examiner

METHODS, APPARATUS AND SYSTEMS FOR INDICATING TRANSMISSION FAILURES IN A WIRELESS COMMUNICATION

RELATED APPLICATION

This application is a continuation of International Application No. PCT/CN2018/124703, filed Dec. 28, 2018, the entirety of which is hereby incorporated by reference.

TECHNICAL FIELD

The disclosure relates generally to wireless communications and, more particularly, to methods, apparatus and systems for indicating transmission failures in a wireless communication.

BACKGROUND

The 4th Generation mobile communication technology (4G) Long-Term Evolution (LTE) or LTE-Advance (LTE-A) and the 5th Generation mobile communication technology (5G) face more and more demands. As the number of applications and services for digital data continues to explode, the demands and challenges placed on network resources and operators will continue to increase. The utilization of the licensed radio spectrum, or spectrum for short, is already close to a saturation point. In addition, use of the licensed spectrum may come with a licensing cost for operators. For some regions with private network deployments, efficient use of the unlicensed spectrum with wider bandwidth (e.g., 80 or 100 MHz), may reduce implementation complexity for both networks and terminals (e.g., user equipment or UE), compared to carriers of smaller bandwidth, when moving to address larger amounts of spectrum.

In an unlicensed spectrum, a listen-before-talk (LBT) applying a clear channel assessment (CCA) check is performed before transmitting. The CCA utilizes at least energy detection to determine the presence or absence of other signals on the channel in order to determine if the channel is occupied or clear, respectively. If the channel is occupied, the UE needs to wait for a while to proceed the next LBT. If the channel is clear, the UE can transmit. Due to the opportunity occupation characteristic, the UE may not transmit timely, or may not transmit for a while, or even have no chance to transmit. For unlicensed spectrum, if a transmission cannot be performed at the physical layer, it can impact the processing at the upper layer(s). For example, some procedures will not be terminated.

Thus, existing systems and methods for handling transmission failures in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: obtaining, by a first layer module of the wireless communication device, an indication from a second layer module of the wireless communication device. The first layer module is configured for performing a process at a first layer. The second layer module is configured for performing a process at a second layer that is different from the first layer. The indication indicates whether there is a transmission failure of the wireless communication device at the second layer.

In another embodiment, a method performed by a wireless communication device is disclosed. The method comprises: performing, by a first layer module of the wireless communication device, a wireless transmission of a message at a first layer; and sending, by the first layer module, an indication to a second layer module of the wireless communication device. The first layer module is configured for performing a process at the first layer. The second layer module is configured for performing a process at a second layer that is different from the first layer. The indication indicates whether there is a transmission failure of transmitting the message at the first layer.

In yet another embodiment, a method performed by a wireless communication device is disclosed. The method comprises: obtaining, by a first layer module of the wireless communication device, an indication from a second layer module of the wireless communication device. The first layer module is configured for performing a process at a first layer. The second layer module is configured for performing a process at a second layer that is different from the first layer. The indication indicates a transmission failure issue at a third layer that is different from the first layer and the second layer.

In a different embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
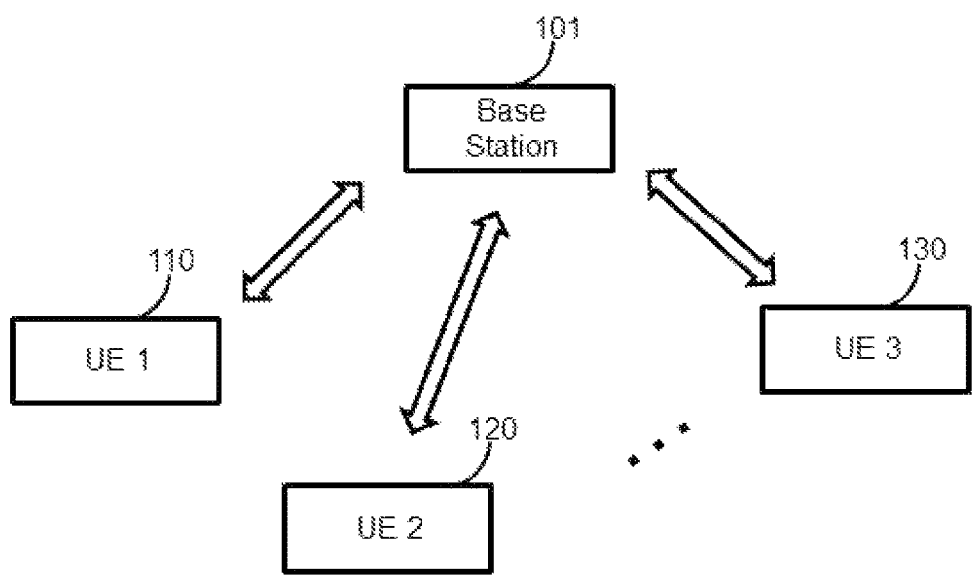
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

A transmission of a UE may be blocked due to some reasons, such as a listen-before-talk (LBT) failure in unlicensed spectrum, a power backoff, and a collision with ultra-reliable low-latency communication (URLLC) service. Once a transmission is blocked at the physical layer, it can affect the processing in the upper layer(s). In order to solve these problems, the present teaching discloses systems and methods for informing a unified indication to the upper layer.

In addition, when a transmission is blocked in the lower layer, the transmission failure indication is informed to the middle layer, that is lower than the upper layer and higher than the lower layer (e.g. physical layer). The failure numbers may be counted in the middle layer. In one embodiment, the transmission failure numbers are counted regardless whether the failures are continuous or discontinuous. In another embodiment, only continuous or consecutive transmission failure numbers are counted. In another embodiment, both a timer and counter are used. When a transmission failure indication is received, the counter is incremented by one, and the timer is started or restarted. When the timer expires, the counter is reset. In one embodiment, when the counter reaches a threshold, the transmission failure problem may be indicated to the upper layer. When the upper layer receives it, it may declare a radio link failure (RLF).

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. The BS 101 and a UE, e.g. UE 1 110, may communicate with each other either under a licensed spectrum or under an unlicensed spectrum.

In some countries and regions, there are corresponding regulatory policies for the use of unlicensed spectrum. For example, a UE must perform Listen Before Talk (LBT), also known as Clear Channel Assessment (CCA), before sending data using an unlicensed carrier. As such, only LBT-enabled devices or UEs can send data on the unlicensed carrier. Under NR licensed carriers, SS/PBCH blocks (synchronization signal/physical broadcast channel blocks, abbreviated as SSB) have cell search, synchronization, and measurement functions. Due to the special nature of unlicensed carriers, such as the need to perform LBT before sending data, the transmission of SS/PBCH block and/or discovery signals faces uncertainty. In this case, when a UE encounters a transmission failure at the physical (PHY) layer, e.g. due to the LBT failure, the UE may indicate the transmission failure to its media access control (MAC) layer, that is higher than the PHY layer. Some statistics can be calculated at the MAC layer to determine whether to declare a radio link failure (RLF) at the radio resource control (RRC) layer or not.

Figure 2:
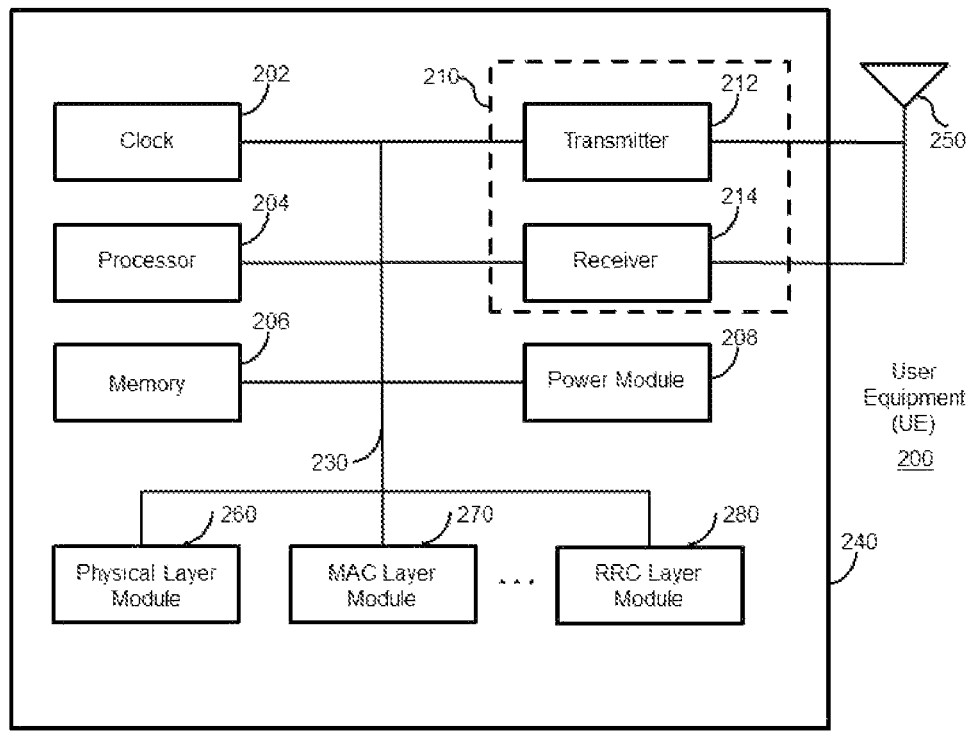
FIG. 2 illustrates a block diagram of a user equipment (UE), in accordance with some embodiments of the present disclosure.

FIG. 2 illustrates a block diagram of a user equipment (UE) 200, in accordance with some embodiments of the present disclosure. The UE 200 is an example of a device that can be configured to implement the various methods described herein. As shown in FIG. 2, the UE 200 includes a housing 240 containing a system clock 202, a processor 204, a memory 206, a transceiver 210 comprising a transmitter 212 and receiver 214, a power module 208, a physical layer module 260, a MAC layer module 270, and a RRC layer module 280.

In this embodiment, the system clock 202 provides the timing signals to the processor 204 for controlling the timing of all operations of the UE 200. The processor 204 controls the general operation of the UE 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the UE 200 to transmit and receive data to and from a remote device (e.g., a BS or another UE). An antenna 250 is typically attached to the housing 240 and electrically coupled to the transceiver 210. In various embodiments, the UE 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the UE 200 may perform a wireless transmission of a message at the physical layer, by the physical layer module 260 of the UE 200. The physical layer module 260 may send an indication to the MAC layer module 270 to indicate whether there is a transmission failure of transmitting the message at the physical layer. The physical layer module 260 is configured for performing a process at the physical layer. The MAC layer module 270 is configured for performing a process at the MAC layer that is higher than the physical layer. According to various embodiments, the transmission failure is due to at least one of: a listen-before-talk (LBT) failure in unlicensed spectrum; a power backoff; and a collision with ultra-reliable low-latency communication (URLLC) service.

After the MAC layer module 270 obtains the indication from the physical layer module 260, the MAC layer module 270 may analyze the indication to determine whether there is a transmission failure at the physical layer. The MAC layer module 270 may calculate statistics related to transmission failures at the physical layer, e.g. based on a counter and/or a timer, to determine whether to indicate the failure issue to the RRC layer module 280.

The RRC layer module 280, upon receiving an indication from the MAC layer module 270 about the transmission failure issue, may declare a radio link failure (RLF). The RRC layer module 280 is configured for performing a process at the RRC layer that is higher than the MAC layer. There may be additional modules working in the UE 200 on other layers, according to various embodiments. A detailed description about each of the physical layer module 260, the MAC layer module 270 and the RRC layer module 280 will be provided with respect to FIG. 3.

The power module 208 can include a power source such as one or more batteries, and a power regulator, to provide regulated power to each of the above-described modules in FIG. 2. In some embodiments, if the UE 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the UE 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the MAC layer module 270. Conversely, each of the modules illustrated in FIG. 2 can be implemented using a plurality of separate components or elements.

Figure 3:
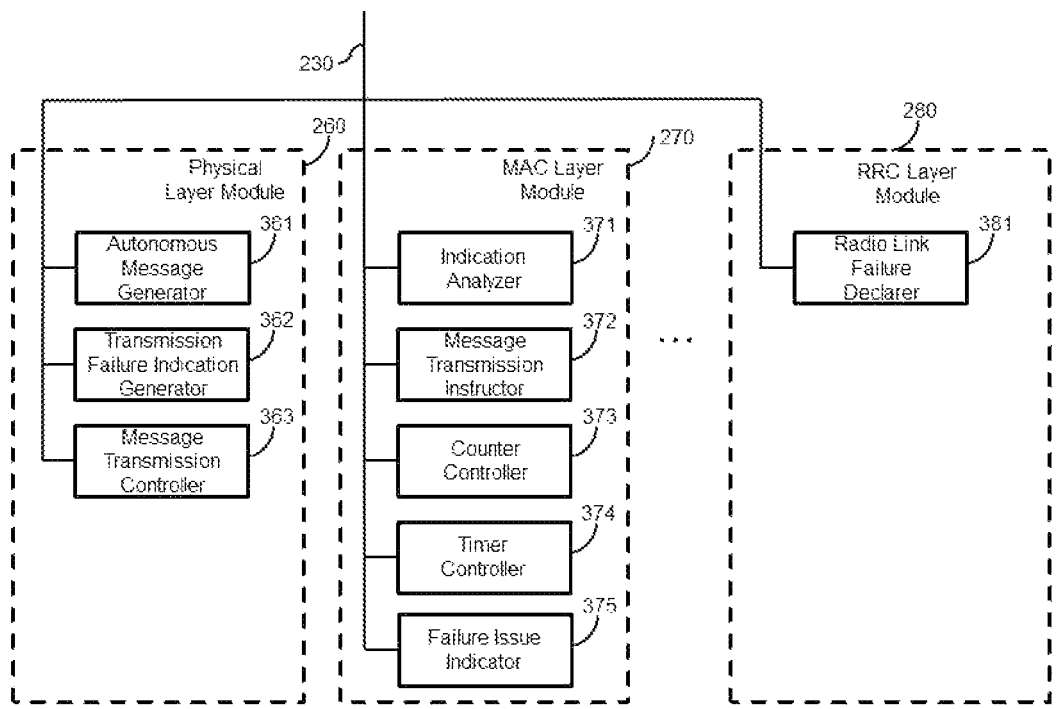
FIG. 3 illustrates detailed block diagrams of several modules in a UE, in accordance with some embodiments of the present disclosure.

FIG. 3 illustrates detailed block diagrams of several modules in a UE, in accordance with some embodiments of the present disclosure. FIG. 3 shows exemplary inner components of the physical layer module 260, the MAC layer module 270 and the RRC layer module 280 of the UE 200 in FIG. 2. As shown in FIG. 3, the physical layer module 260 in this example includes an autonomous message generator 361, a transmission failure generator 362, and a message transmission controller 363. The MAC layer module 270 in this example includes an indication analyzer 371, a message transmission instructor 372, a counter controller 373, a timer controller 374, and a failure issue indicator 375. The RRC layer module 280 in this example includes a radio link failure declarer 381. According to various embodiments, each of the physical layer module 260, the MAC layer module 270 and the RRC layer module 280 may include additional component(s) and each component in the physical layer module 260, the MAC layer module 270 and the RRC layer module 280 may optional. The various modules shown in FIG. 3 are coupled together and coupled to the components shown in FIG. 2 by the bus system 230.

The message transmission controller 363 may perform, via the transmitter 212, a wireless transmission of a message at the physical layer. In one embodiment, the message transmission controller 363 obtains, from the MAC layer module 270, an instruction for transmitting the message at the physical layer. In another embodiment, the autonomous message generator 361 autonomously generates the message and sends the message to the message transmission controller 363 for transmission at the physical layer. The message may include information about at least one of: a preamble; a protocol data unit (PDU); and a scheduling request (SR).

The transmission failure generator 362 in this example may generate and send a transmission failure indication to the MAC layer module 270 to indicate whether there is a transmission failure of transmitting the message at the physical layer. In one embodiment, the indication is only generated and sent when there is a transmission failure, such that the MAC layer module 270 can be aware of a transmission failure when receiving the indication within a predetermined time, and be aware of a transmission success when not receiving the indication within the predetermined time.

The indication analyzer 371 in this example may obtain the indication from the physical layer module 260 and analyze the indication to determine whether there is a transmission failure of the UE 200 at the physical layer. The message transmission instructor 372 in this example may instruct the physical layer module 260 to transmit a message at the physical layer, wherein the transmission failure is a failure of transmitting the message at the physical layer. In one embodiment, the transmission failure is a failure of transmitting a message autonomously generated by the physical layer module 260 at the physical layer. The message may include information about at least one of: a preamble; a protocol data unit (PDU); and a scheduling request (SR).

In one embodiment, the indication analyzer 371 determines, based on the indication, there is a transmission failure of the UE at the physical layer, and informs the failure to the counter controller 373. The counter controller 373 can then increase, in response to the determining of the indication analyzer 371, a counter at the MAC layer by one.

In one embodiment, the indication analyzer 371 further informs the failure to the timer controller 374. The timer controller 374 may then restart, in response to the determining of the indication analyzer 371, a timer at the MAC layer. In response to an expiration of the timer, the timer controller 374 informs the counter controller 373 about the timer expiration, and the counter controller 373 may reset the counter at the MAC layer in response to the expiration of the timer.

In one embodiment, in response to the determining of the indication analyzer 371, the timer controller 374 may start a timer that is not running at the MAC layer. In response to an expiration of the timer, the timer controller 374 informs the counter controller 373 about the timer expiration, and the counter controller 373 may reset the counter at the MAC layer in response to the expiration of the timer.

In one embodiment, the counter controller 373 determines and informs the failure issue indicator 375 that the counter reaches a predetermined threshold. The failure issue indicator 375 can then generate and send an indication to the RRC layer module 280 to indicate a transmission failure issue of the physical layer and/or the MAC layer.

In another embodiment, the indication analyzer 371 determines, based on the indication, there is no transmission failure at the physical layer by a predetermined time related to a message transmission, and informs the determination to the counter controller 373. The counter controller 373 may then reset, in response to the determining of the indication analyzer 371, a counter at the MAC layer. The counter is for counting transmission failure at the physical layer.

In another embodiment, the indication analyzer 371 determines, based on the indication, there is a failure of transmitting a message at the physical layer, and informs the failure to the counter controller 373. The counter controller 373 can then increase, in response to the determining of the indication analyzer 371, a counter associated with the message at the MAC layer by one. That is, there may be multiple counters each corresponding to a different type of message transmission. After the counter controller 373 determines and informs the failure issue indicator 375 that the counter reaches a predetermined threshold associated with the message, the failure issue indicator 375 can then generate and send an indication to the RRC layer module 280 to indicate a transmission failure issue associated with the message at the physical layer and/or the MAC layer.

In another embodiment, the indication analyzer 371 determines, based on the indication, there is a failure of transmitting a scheduling request (SR) at the physical layer, and informs the failure to the timer controller 374. The timer controller 374 can then stop, in response to the determining of the indication analyzer 371, a timer that is running and associated with SR transmission at the physical layer. Since the timer is stopped, the timer controller 374 can inform the physical layer module 260 to re-transmit the scheduling request (SR) at the physical layer in a next available SR transmission occasion that is pre-configured and independent of the timer.

In another embodiment, the indication analyzer 371 determines, based on the indication, there is a success of transmitting a scheduling request (SR) at the physical layer, and informs the failure to the counter controller 373 and the timer controller 374. The counter controller 373 can then increase, in response to the determining of the indication analyzer 371, a counter associated with the SR at the MAC layer by one. The timer controller 374 can restart, in response to the determining of the indication analyzer 371, a timer that is associated with SR transmission at the MAC layer. In response to an expiration of the timer, the timer controller 374 can inform the physical layer module 260 to re-transmit the scheduling request (SR) at the physical layer.

The radio link failure declarer 381 in this example is configured for obtaining an indication from the MAC layer module 270 and analyzing the indication to determine a transmission failure issue at the physical layer and the MAC layer. Based on the indication of the transmission failure issue, the radio link failure declarer 381 can declare a radio link failure (RLF).

Figure 4:
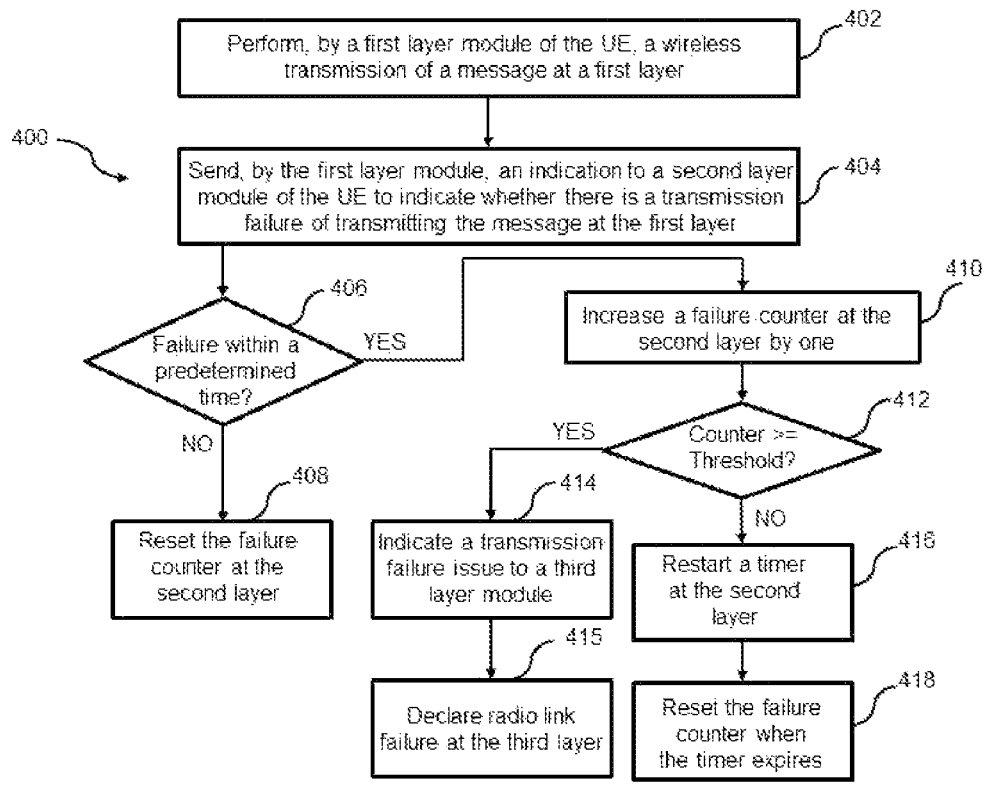
FIG. 4 illustrates a flow chart for a method performed by a UE for indicating transmission failures, in accordance with some embodiments of the present disclosure.

FIG. 4 illustrates a flow chart for a method 400 performed by a UE, e.g. the UE 200 in FIG. 2, for indicating transmission failures, in accordance with some embodiments of the present disclosure. At operation 402, the UE performs, by a first layer module (e.g. the physical layer module 260) of the UE, a wireless transmission of a message at a first layer (e.g. the physical layer). At operation 404, an indication is sent, from the first layer module to a second layer module (e.g. the MAC layer module 270) of the UE to indicate whether there is a transmission failure of transmitting the message at the first layer. It is determined at the operation 406 whether a transmission failure is received by the second layer module within a predetermined time. If not, the process goes to operation 408 to reset a failure counter at the second layer. Otherwise, if a transmission failure is received by the second layer module within the predetermined time, the failure counter at the second layer is increased by one at operation 410.

Then at operation 412, it is determined whether the counter reaches a predetermined threshold. If so, the process goes to operation 414 to indicate a transmission failure issue to a third layer module (e.g. the RRC layer module 280), which can declare radio link failure (RLF) at operation 415. If not, the process goes to operation 416 to restart a timer at the second layer. When the time expires, the failure counter is reset at operation 418.

Figure 5:
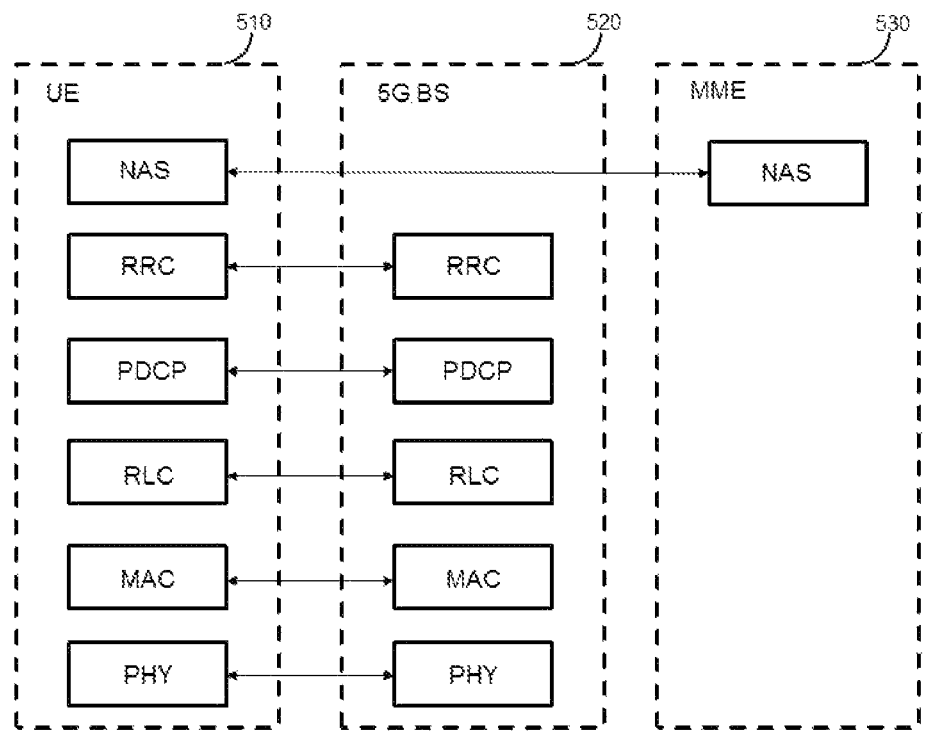
FIG. 5 illustrates an exemplary control plane protocol stack in a UE and a network side, in a 5G system, in accordance with some embodiments of the present disclosure.

FIG. 5 illustrates an exemplary control plane protocol stack in a UE and a network side (e.g., a 5G base station and a mobility management entity (MME)), in a 5G system, in accordance with some embodiments of the present disclosure. The UE 510 in this example includes a non-access stratum (NAS) layer, a radio resource control (RRC) layer, a data convergence protocol (PDCP) layer, a radio link control (RLC) layer, a medium access control (MAC) layer, and a physical (PHY) layer. The 5G BS 520 includes an RRC layer, a PDCP layer, an RLC layer, a MAC layer, and a PHY layer, and the MME includes an NAS layer.

The PDCP layer resides above the RLC layer, which resides above the MAC layer, which resides above the PHY layer. The RRC layer resides above the PDCP layer, which resides above the RLC layer, which resides above the MAC layer. There are many signaling procedures between the UE and the network side including layer 3 signaling procedures, (such as RRC signaling procedures and NAS signaling procedures), and layer 2 signaling procedures, (such as MAC control signaling or RLC related signaling procedure, such as RLC reset procedure). Timely execution of such control plane, (e.g., RRC), or user plane, (e.g., RLC or MAC), signaling procedures is a critical factor in achieving speedy and reliable communications.

Different embodiments of the present disclosure will now be described in detail hereinafter. It is noted that the features of the embodiments and examples in the present disclosure may be combined with each other in any manner without conflict.

In a first embodiment, a transmission may be blocked due to some reasons, e.g. LBT failures in unlicensed spectrum, power backoff, colliding with URLLC service and so on. In some cases, the transmission blocking may impact the processing of the other layers. Therefore, the other layers need to know the transmission outcome. According to this embodiment, an indication is informed to the other layers, such that the other layers may do something according to the indication.

According to a second embodiment, in unlicensed spectrum, a transmission may be blocked due to LBT failure, such as SR transmission, each message transmission in RACH procedure, and PUSCH transmission. When the transmission fails, it may impact the processing of the other layer, e.g. the MAC layer. For random access channel (RACH) procedure, when preamble transmission is blocked due to LBT failure, power ramping counter is not incremented. Therefore, the physical layer needs to inform transmission failure to the MAC layer, so that power ramping counter is not incremented in the next preamble transmission to avoid unnecessary power increase for re-transmission.

In addition, for SR procedure, when SR transmission is blocked due to LBT failure, the prohibit timer is not started in the MAC layer. Therefore, a transmission failure indication should be informed to the MAC layer, so that the prohibit timer is not started, or is stopped to avoid unnecessary waiting time for re-transmission.

For physical uplink shared channel (PUSCH) transmission, a transmission is blocked due to LBT failure, especially for configured grant transmission. If MAC protocol data unit (PDU) is indicated to the physical layer, a timer will be started in the MAC layer. If transmission is blocked due to LBT failure, UE will wait for the timer to expire to perform the next transmission, which increases the transmission delay. In this case, a transmission indication should be informed to the MAC layer, so that it may stop the timer and perform the next transmission as soon as possible.

Therefore, for SR procedure, RACH procedure, and PUSCH transmission, a transmission failure indication may be informed to the MAC layer, such that UE may perform the other operations according to the indication in order to increase the system performance.

According to a third embodiment, a transmission failure counter is introduced. When a transmission is blocked in the lower layer, a transmission failure indication is informed to the middle layer. Then the transmission failure counter is incremented by 1. When the transmission failure counter reaches a threshold, the failure problem should be indicated to the upper layer.

For SR procedure, RACH procedure and PUSCH transmission procedure in the MAC layer, the transmission failure counter may be a uniform counter for these procedures. The transmission counter is not restricted to continuous transmission failure. For example, once a transmission failure is received, the counter is incremented. Taking RACH procedure as an example, when RACH procedure is triggered, the following steps may be performed.

Step 1: the MAC layer selects preamble, and indicates it to the physical layer.

Step 2: the physical layer performs LBT before transmission.

Step 3: if LBT fails, the physical layer informs the transmission failure indication to the MAC layer.

Step 4: when the MAC layer receives the transmission failure indication, the transmission failure counter is incremented by 1, otherwise it is not incremented.

Step 5: if the transmission failure counter reaches a threshold, it should indicate the transmission failure problem to the RRC layer.

Step 6: when the RRC layer receives the transmission failure problem, it may declare radio link failure (RLF).

In addition to the transmission indicated by the MAC layer, there are some message transmissions which do not need to be indicated by the MAC layer and are directly transmitted in the physical layer, for example, transmitted HARQ feedback and channel state information (CSI) via physical uplink control channel (PUCCH), sounding reference signal (SRS). For these messages, when a transmission is blocked, if the transmission failure indication is not informed to the MAC layer, it means the transmission failure counter is only used for the statistics of transmission failure of indicated message in the MAC layer. If the transmission failure indication is informed to the MAC layer, the transmission failure counter will also be incremented once it is received. These detailed steps are described as follows.

Step 1: HARQ feedback/CSI needs to be transmitted and only PUCCH resource may be used for transmission in the physical layer.

Step 2: if LBT fails, the physical layer informs the transmission failure indication to the MAC layer.

Step 3: when the MAC layer receives the transmission failure indication, the transmission failure counter is incremented by 1, otherwise it is not incremented.

Step 4: if the transmission failure counter reaches a threshold, it should indicate the transmission failure problem to the RRC layer.

Step 5: when the RRC layer receives the transmission failure problem, it may declare RLF.

According to a fourth embodiment, a transmission failure counter is introduced. When transmission is blocked in the lower layer, a transmission failure indication is informed to the middle layer. Then the transmission failure counter is incremented by 1. When the transmission failure counter reaches a threshold, the failure problem should be indicated to the upper layer.

For each procedure, such as SR procedure, RACH procedure, and PUSCH transmission procedure, the transmission failure counter may be a uniform counter for these procedures. Herein the consecutive transmission failure numbers are counted. Once a transmission is indicated to the lower layer and the transmission failure indication is not received, the transmission failure counter is reset, otherwise it is incremented by 1. When the transmission failure counter reaches a threshold, the middle layer should indicate the transmission failure problem to the upper layer. Taking RACH procedure as an example, when RACH procedure is triggered, the following steps may be performed.

Step 1: the MAC layer selects preamble, and indicates it to the physical layer.

Step 2: the physical layer performs LBT before transmission.

Step 3: if LBT fails, the physical layer informs the transmission failure indication to the MAC layer.

Step 4: when the MAC layer receives the transmission failure indication, the transmission failure counter is incremented by 1, otherwise when the message transmission ends, if there is no indication to be received, the counter will be reset.

Step 5: if the transmission failure counter reaches a threshold, the MAC layer should indicate the transmission failure problem to the RRC layer.

Step 6: when the RRC layer receives the transmission failure problem, it may declare RLF.

According to a fifth embodiment, when transmission is blocked in the lower layer, a transmission failure indication is informed to the middle layer. Then the transmission failure counter is incremented by 1. When the transmission failure counter reaches a threshold, the failure problem should be indicated to the upper layer. For each procedure, such as SR procedure, RACH procedure, and PUSCH transmission procedure, the transmission failure counter may be a uniform counter for these procedures. Herein both a timer and a counter are used, when the transmission failure indication is received, the timer is started or restarted, and the transmission failure counter is incremented by 1. When the transmission failure indication is not received within the timer, the transmission counter is reset. When the transmission failure counter reaches a threshold, the middle layer should indicate the transmission failure problem to the upper layer. Taking RACH procedure as an example, when RACH procedure is triggered, the following steps may be performed.

Step 1: the MAC layer selects preamble, and indicates it to the physical layer.

Step 2: the physical layer performs LBT before transmission.

Step 3: if LBT fails, the physical layer informs the transmission failure indication to the MAC layer.

Step 4: when the MAC layer receives the transmission failure indication, the transmission failure counter is incremented by 1 and the timer is started or restarted. When the timer expires, the transmission counter is reset.

Step 5: if the transmission failure counter reaches a threshold, the MAC layer should indicate the transmission failure problem to the RRC layer.

Step 6: when the RRC layer receives the transmission failure problem, it may declare RLF.

In addition to the transmission indicated by the MAC layer, there are some message transmissions which do not need to be indicated by the MAC layer and are directly transmitted in the physical layer, for example, transmitted HARQ feedback and CSI via PUCCH, SRS. For these messages, when transmission is blocked, if the transmission failure indication is not informed to the MAC layer, it means the transmission failure counter is only used for the statistics of transmission failure of indicated message in the MAC layer. If the transmission failure indication is informed to the MAC layer, the transmission failure counter will also be incremented once it is received. These detailed steps are described as follows.

Step 1: HARQ feedback/CSI needs to be transmitted and only PUCCH resource may be used for transmission in the physical layer.

Step 2: if LBT fails, the physical layer informs the transmission failure indication to the MAC layer.

Step 3: when the MAC layer receives the transmission failure indication, the transmission failure counter is incremented by 1 and the timer is started or restarted. When the timer expires, the transmission counter is reset.

Step 4: if the transmission failure counter reaches a threshold, it should indicate the transmission failure problem to the RRC layer.

Step 5: when the RRC layer receives the transmission failure problem, it may declare RLF.

According to a sixth embodiment, for PUSCH, UE autonomously transmits PUSCH via configured grant resource. When the channel occupancy rate is very high, LBT failure always happens, such that transmission has been attempted. In order to terminate the transmission attempt procedure, a counter may be introduced. When the transmission fails due to LBT, a failure indication is informed to the MAC layer. When the MAC layer receives the indication, the counter is incremented by 1. The failure indication may be continuous or discontinuous. A detailed procedure may be described as follows.

Step 1: the MAC layer indicates the MAC PDU to the physical layer.

Step 2: the physical layer performs LBT before transmission.

Step 3: if LBT fails, a failure indication is informed to the MAC layer.

Step 4: the MAC layer receives the indication, and the counter is incremented by 1.

Step 5: if the counter reaches a threshold, a transmission failure problem is indicated to the RRC layer.

Step 6: when the RRC layer receives the transmission failure problem, it declares RLF.

According to a seventh embodiment, for PUSCH, UE autonomously transmits PUSCH via configured grant resource. When the channel occupancy rate is very high, LBT failure always happens, such that transmission has been attempted. In order to terminate the transmission attempt procedure, both a counter and a timer may be introduced. When the transmission fails due to LBT, a failure indication is informed to the MAC layer. When the MAC layer receives the indication within the timer, the counter is incremented by 1, and the timer is started or restarted. When the timer expires, the failure indication is not received, the counter will be reset. A detailed procedure may be described as follows.

Step 1: the MAC layer indicates the MAC PDU to the physical layer.

Step 2: the physical layer performs LBT before transmission.

Step 3: if LBT fails, a failure indication is informed to the MAC layer.

Step 4: the MAC layer receives the indication within the timer, the counter is incremented by 1, and the timer is started or restarted. When the timer expires, the indication is not received, and the counter is reset.

Step 5: if the counter reaches a threshold, a transmission failure problem is indicated to the RRC layer.

Step 6: when the RRC layer receives the transmission failure problem, it declares RLF.

According to an eighth embodiment, for unlicensed spectrum, SR is not transmitted due to LBT failure. In this case, the SR prohibit timer should not be started. It should perform SR transmission in the next available SR transmission occasion as soon as possible. Then an indication should be informed to the MAC layer. If a LBT failure indication is informed to the MAC layer, UE may stop the timer. In addition, SR counter should not be incremented in order to avoid unnecessary RLF. When LBT failure indication is informed to the MAC layer, the handling on SR procedure in the MAC layer may be modified as follows.

For the SR configuration corresponding to the pending SR: if the notification of transmission failure has been received from lower layer, and if sr-ProhibitTimer is running, stop sr-ProhibitTimer. Else if the notification of transmission failure has not been received from lower layer, increment SR_COUNTER by 1.

When the MAC entity has an SR transmission occasion on the valid PUCCH resource for SR configured; and if sr-ProhibitTimer is not running at the time of the SR transmission occasion; and if the PUCCH resource for the SR transmission occasion does not overlap with a measurement gap; and if the PUCCH resource for the SR transmission occasion does not overlap with a UL-SCH resource, and if SR_COUNTER<sr-TransMax+1: instruct the physical layer to signal the SR on one valid PUCCH resource for SR; start the sr-ProhibitTimer.

If SR counter is not incremented, the SR procedure may not be terminated. In order to avoid the case, each of the third, fourth, fifth and tenth embodiments may serve as a solution to terminate the procedure.

According to a ninth embodiment, for unlicensed spectrum, SR is not transmitted due to LBT failure. In this case, SR prohibit timer should not be started. It should perform SR transmission in the next available SR transmission occasion as soon as possible. Then an indication should be informed to the MAC layer. In addition, SR counter should not be incremented in order to avoid unnecessary RLF. If a LBT success indication is informed to the MAC layer, the SR prohibit timer is started and SR counter is incremented by 1. Otherwise the timer is not started, and the counter is not incremented. When LBT success indication is informed to the MAC layer, the handling on SR procedure in the MAC layer may be modified as follows.

For the SR configuration corresponding to the pending SR: if the notification of transmission success has been received from lower layer, increment SR_COUNTER by 1; and start the sr-ProhibitTimer.

According to a tenth embodiment, if a transmission is blocked in the lower layer, a transmission failure indication is informed to the middle layer. Then the transmission failure counter is incremented. When the transmission failure counter reaches a threshold, the failure problem should be indicated to the upper layer.

For SR procedure, RACH procedure and PUSCH transmission procedure in the MAC layer, the transmission failure counter may be a uniform counter for these procedures. Besides the transmission failure counter, a timer is also used. When the transmission failure indication is received and the timer is not running, the timer is started and the transmission counter is incremented by 1. If the transmission failure indication is received within the timer, the transmission failure counter is incremented by 1. If the timer expires, the transmission counter is reset. When the transmission failure counter reaches a threshold, the middle layer will indicate the transmission failure problem to the upper layer. Taking RACH procedure as an example, when RACH procedure is triggered, the following steps may be performed.

Step 1: the MAC layer selects preamble, and indicates it to the physical layer.

Step 2: the physical layer performs LBT before transmission.

Step 3: if LBT fails, the physical layer informs the transmission failure indication to the MAC layer.

Step 4: when the transmission failure indicated is received and the timer is not running, the timer is started and the transmission failure counter is incremented by 1. When the transmission failure indicated is received within the timer, the transmission failure counter is incremented by 1. When the timer expires, the transmission failure counter is reset.

Step 5: if the transmission failure counter reaches a threshold, the MAC layer should indicate the transmission failure problem to the RRC layer.

Step 6: when the RRC layer receives the transmission failure problem, it may declare RLF.

In addition to the transmission indicated by the MAC layer, there are some message transmissions which do not need to be indicated by the MAC layer and are directly transmitted in the physical layer, for example, transmitted HARQ feedback and CSI via PUCCH, SRS. For these messages, when a transmission is blocked, if the transmission failure indication is not informed to the MAC layer, it means the transmission failure counter is only used for the statistics of transmission failure of indicated message in the MAC layer. If the transmission failure indication is informed to the MAC layer, the transmission failure counter will also be incremented once it is received. These detailed steps may be described as follows.

Step 1: HARQ feedback/CSI needs to be transmitted and only PUCCH resource may be used for transmission in the physical layer.

Step 2: if LBT fails, the physical layer informs the transmission failure indication to the MAC layer.

Step 3: when the transmission failure indicated is received and the timer is not running, the timer is started and the transmission failure counter is incremented by 1. When the transmission failure indicated is received within the timer, the transmission failure counter is incremented by 1. When the timer expires, the transmission failure counter is reset.

Step 4: if the transmission failure counter reaches a threshold, it should indicate the transmission failure problem to the RRC layer.

Step 5: when the RRC layer receives the transmission failure problem, it may declare RLF.

According to an eleventh embodiment, when transmission is blocked in the lower layer, a transmission failure indication is informed to the middle layer. Then the transmission failure counter is incremented. When the transmission failure counter reaches a threshold, the failure problem should be indicated to the upper layer.

For SR procedure, RACH procedure and PUSCH transmission procedure in the MAC layer, the transmission failure counter may be a uniform counter for these procedures. Besides the transmission failure counter, a timer is also used. When the transmission failure indication is received and the timer is not running, the timer is started and the transmission counter is incremented by 1. If the transmission failure indication is received within the timer, the transmission failure counter is incremented by 1. If the timer expires, the transmission counter is reset. When the transmission failure counter reaches a threshold, the middle layer will indicate the transmission failure problem to the upper layer.

Taking RACH procedure as an example, when RACH procedure is triggered, the following steps may be performed. Multiple thresholds may be introduced, for example, a threshold for Message 3 (Msg3) transmission in the RACH procedure, a threshold for preamble transmission. When a transmission failure indication for Msg3 is received, the transmission failure counter is incremented. If the counter reaches the threshold for Msg3 transmission, the transmission failure problem is indicated to the RRC layer. When a transmission failure indication for preamble transmission is received, the transmission failure counter is incremented. If the counter reaches the threshold for preamble transmission, the transmission failure problem is indicated to the RRC layer.

According to a twelfth embodiment, when all UL transmissions are blocked in the lower layer, a transmission failure indication is informed to the upper layer. Then the transmission failure counter is incremented. When the transmission failure counter reaches a threshold, RLF will be triggered. For all uplink transmissions, a common counter and a timer are proposed. The statistics approaches of the failure indication in the third, fourth, fifth, and/or tenth embodiments may be used for this embodiment as well.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   determining a type of a to-be-transmitted message;
   obtaining, by a media access control (MAC) layer of the wireless communication device, an indication from a physical layer of the wireless communication device when the type of the message belongs to a message type group, wherein the indication indicates a transmission failure of the wireless communication device at the physical layer, the transmission failure being due to a listen-before-talk (LBT) failure in unlicensed spectrum;
   starting, in response to the indication, a timer at the MAC layer;
   incrementing, in response to the indication, a counter at the MAC layer by one;
   determining that the counter has reached a predetermined threshold; and
   indicating, after the timer is started, a MAC layer transmission failure to a radio resource control (RRC) layer of the wireless communication device.

2. The method of claim 1, further comprising:
   restarting, in response to another indication indicating a transmission failure of the wireless communication device at the physical layer due to an LBT failure in unlicensed spectrum, the timer at the MAC layer.

3. The method of claim 1, further comprising:
   resetting the counter at the MAC layer in response to an expiration of the timer.

4. The method of claim 1, further comprising
   determining a radio link failure (RLF) at the RRC layer based on the indicated MAC layer transmission failure.

5. A user equipment configured to carry out the method of claim 1.

6. The user equipment of claim 5, further configured to restart, in response to another indication indicating a transmission failure of the wireless communication device at the physical layer due to an LBT failure in unlicensed spectrum, the timer at the MAC layer.

7. The user equipment of claim 5, further configured to reset the counter at the MAC layer in response to an expiration of the timer.

8. The user equipment of claim 5, further configured to determine a radio link failure (RLF) at the RRC layer based on the indicated MAC layer transmission failure.

9. A wireless communication device, comprising:
   a physical layer, configured to provide an indication when a type of the message is determined to belong to a message type group, which indicates a transmission failure of the wireless communication device at the physical layer, the transmission failure being due to a listen-before-talk (LBT) failure in unlicensed spectrum;
   a media access control (MAC) layer, configured to obtain the indication and comprising:
      a timer, configured to be started in response to the indication; and
      a counter, configured to be incremented by one in response to the indication; and
   the MAC layer is further configured to:
      determine whether the counter has reached a predetermined threshold; and
      in response to determining the counter has reached the predetermined threshold, indicate, after the timer is started, a MAC layer transmission failure to a radio resource control (RRC) layer of the wireless communication device.

10. The wireless communication device of claim 9, wherein the timer is further configured to be restarted in response to another indication indicating a transmission failure of the wireless communication device at the physical layer due to an LBT failure in unlicensed spectrum.

11. The wireless communication device of claim 9, wherein the counter is further configured to be reset in response to an expiration of the timer.

12. The wireless communication device of claim 9, wherein the RRC layer is further configured to determine a radio link failure (RLF) based on the indication of the MAC layer transmission failure.

13. A non-transitory computer-readable medium having stored thereon computer executable instructions, the computer executable instructions, when being executed, configured to cause a wireless communication device to perform steps comprising:
   determining a type of a to-be-transmitted message;
   obtaining, by a media access control (MAC) layer of the wireless communication device, an indication from a physical layer of the wireless communication device when the type of the message belongs to a message type group, wherein the indication indicates a transmission failure of the wireless communication device at the physical layer, the transmission failure being due to a listen-before-talk (LBT) failure in unlicensed spectrum;
   starting, in response to the indication, a timer at the MAC layer;
   incrementing, in response to the indication, a counter at the MAC layer by one;
   determining that the counter has reached a predetermined threshold; and
indicating, after the timer is started, a MAC layer transmission failure to a radio resource control (RRC) layer of the wireless communication device.

14. The non-transitory computer-readable medium of claim 13, wherein the computer executable instructions, when being executed, is further configured to cause the wireless communication device to restart, in response to another indication indicating a transmission failure of the wireless communication device at the physical layer due to an LBT failure in unlicensed spectrum, the timer at the MAC layer.

15. The non-transitory computer-readable medium of claim 13, wherein the computer executable instructions, when being executed, is further configured to cause the wireless communication device to reset the counter at the MAC layer in response to an expiration of the timer.

16. The non-transitory computer-readable medium of claim 13, wherein the computer executable instructions, when being executed, is further configured to cause the wireless communication device to determine a radio link failure (RLF) at the RRC layer based on the indicated MAC layer transmission failure.

* * * * *